(12) United States Patent
Gidlund et al.

(10) Patent No.: US 9,338,058 B2
(45) Date of Patent: May 10, 2016

(54) DETERMINATION OF COMMUNICATION ROUTES IN A WIRELESS COMMUNICATION NETWORK

(71) Applicant: ABB RESEARCH LTD, Zürich (CH)

(72) Inventors: Mikael Gidlund, Sundsvall (SE); Johan Åkerberg, Västerås (SE); Pang Zhibo, Kista (SE); Kan Yu, Västerås (SE)

(73) Assignee: ABB RESEARCH LTD, Zürich (CH)

( * ) Notice: Subject to any disclaimer, the term of this patent is extended or adjusted under 35 U.S.C. 154(b) by 0 days.

(21) Appl. No.: 14/411,555

(22) PCT Filed: May 17, 2013

(86) PCT No.: PCT/EP2013/060239
§ 371 (c)(1),
(2) Date: Dec. 29, 2014

(87) PCT Pub. No.: WO2014/005754
PCT Pub. Date: Jan. 9, 2014

(65) Prior Publication Data
US 2015/0156070 A1 Jun. 4, 2015

(30) Foreign Application Priority Data

Jul. 5, 2012 (EP) .................................... 12175093

(51) Int. Cl.
| | | |
|---|---|---|
| H04B 7/185 | (2006.01) | |
| H04L 12/24 | (2006.01) | |
| H04W 40/24 | (2009.01) | |
| H04L 12/751 | (2013.01) | |
| H04L 12/721 | (2013.01) | |
| H04W 40/12 | (2009.01) | |

(52) U.S. Cl.
CPC ............ *H04L 41/0853* (2013.01); *H04L 45/02* (2013.01); *H04L 45/123* (2013.01); *H04L 45/26* (2013.01); *H04W 40/24* (2013.01); *H04W 40/12* (2013.01)

(58) Field of Classification Search
CPC ...................................................... H04W 40/24
USPC ......................................................... 370/338
See application file for complete search history.

(56) References Cited

U.S. PATENT DOCUMENTS

2003/0033394 A1    2/2003    Stine
(Continued)

FOREIGN PATENT DOCUMENTS

| CN | 102055663 A | 5/2011 |
| EP | 2 683 199 A1 | 1/2014 |
| KR | 10-2010-0067011 A | 6/2010 |

*Primary Examiner* — Shripal Khajuria
(74) *Attorney, Agent, or Firm* — Birch, Stewart, Kolasch & Birch, LLP

(57) ABSTRACT

A network manager device in an industrial wireless network sends a network investigating message to other network nodes for processing and forwarding through the network, the message including a message weight. A wireless communication device providing a node in the network receives the message from another network node, determines a communication weight based on the quality of communication, adds the communication weight to the message weight and compares the sum with the node weight. If the sum is lower than the node weight, it is set as new node weight and as new message weight, whereupon the changed message is sent to other nodes in the network. The network manager device maps the topology of the network based on updated node weights, sets a communication scheduling scheme based on the mapped topology and informs the network nodes of the scheme.

20 Claims, 6 Drawing Sheets

(56) References Cited

U.S. PATENT DOCUMENTS

| | | |
|---|---|---|
| 2006/0168317 A1 | 7/2006 | Charzinski et al. |
| 2006/0209785 A1 | 9/2006 | Iovanna et al. |
| 2008/0253290 A1 | 10/2008 | Schollmeier et al. |
| 2011/0164527 A1 | 7/2011 | Mishra et al. |
| 2011/0164565 A1 | 7/2011 | Lee et al. |
| 2011/0267982 A1 | 11/2011 | Zhang et al. |

DETERMINATION OF COMMUNICATION ROUTES IN A WIRELESS COMMUNICATION NETWORK

FIELD OF INVENTION

The present invention generally relates to wireless communication devices in industrial wireless networks. More particularly the present invention relates to a method for allowing a network manager device to determine communication paths in an industrial wireless network, a wireless communication device for an industrial wireless network, a computer program product for a wireless communication device, a method for investigating communication paths in an industrial wireless network, a network manager device for an industrial wireless network and a computer program product for a network manager device of an industrial wireless network.

BACKGROUND

Wireless sensor networks are known to be used in process control systems. Examples on such networks are ZigBee and WirelessHart, ISA100, WIA-PA and Bluetooth. There also exist some WLAN based sensor networks.

These networks often employ a time division communication scheme, such as Time Division Multiple Access (TDMA), where a wireless communication device in the form of field device may access resources in the form of time intervals of the scheme for communication with the process control system.

Some wireless networks use a fixed allocation of the time interval to field devices. This requires a network manager or radio resource manager that manages the resources.

Weights have also been used for various purposes in data networks.

US 2008/0253290 does for instance describe optimization of traffic distribution in a communication network with multipath routing. Distribution weightings are provided for a node of the communication network which has several alternatives or downward links for the routing to a target. The distribution weightings are modified relative to each other as a measure of the traffic loading on the downward links in order to reduce distributed traffic on highly loaded links and to increase distributed traffic on the less loaded links.

US 2006/0209785 describes a method of routing data packets across a multi-layer network which includes a plurality of nodes, a logical level provided with a plurality of logical links and a physical level provided with a plurality of physical links, each of the logical links corresponding to at least one of the physical links. The method comprising assigning a weight to each logical link with respect to a first critical constraint in the logical level, refining the weight assigned to each logical link with respect to a second critical constraint in the physical level and, based on the weights assigned to each link, computing a path at the logical level connecting a start node to an end node for the transport of the data packets.

US 2006/0168317 describes the routing of data packets comprising a target address in a packet switching data network. A first and second transmission path are assigned respective traffic distribution weightings in a routing table for individual target addresses that is assigned to a network node, wherein weightings indicate the respective allocated traffic load per transmission path. The maximum traffic distribution weighting is assigned to the respective first transmission path and the minimum traffic distribution weighting is assigned to the second transmission path. During undisturbed operation, data packets are routed via the first transmission path and if the path is interrupted, the packets are routed via the second transmission path.

US 2011/0164565 describes a method of routing a wireless network. The method is performed by each of a group of nodes and includes: receiving a routing request signal; determining whether a node itself is a destination node, by referring to a traffic distribution table showing traffic throughput of the group of nodes and an intermediate-node weight table showing weights of intermediate nodes on all paths between the group of nodes and a source node, wherein a route path is selected by referring to the weights of intermediate nodes; and when it is determined that the node itself is the destination node transmitting a routing response signal to the source node that has transmitted the routing request signal, and receiving a packet from the source node, wherein the transmitting and receiving are performed by the determined destination node.

Reliable and robust wireless communication between field devices in industrial networks is of highest importance in order to guarantee 24 hour operation 7 days a week. Routing algorithms are important for Industrial Wireless Sensor Networks in order to guarantee packet delivery within the deadline required by industrial applications. In TDMA-based Industrial Wireless Sensor Network, source routing and graph routing are two available routing schemes which exist today.

High reliability and low latency is crucial for industrial applications. Both source and graph routing cannot thoroughly fulfill these requirements. A source routing scheme routes packets by establishing a fixed path from the source to the destination. If any node or link through this path fails, the communication will be terminated. Graph routing schemes are more reliable than source routing by providing additional paths from the source to the destination. However, when the network topology changes, it will take a long time to generate a new graph. During the graph adjusting period, the communication in this network may also be terminated. All of this may lead to economic loss or a safety problem, which is unacceptable for industrial applications.

There is therefore a need for an improvement in relation to industrial wireless networks.

SUMMARY OF THE INVENTION

The present invention is directed towards providing an improved industrial wireless communication network.

One object of the present invention is to provide an improved method for allowing a network manager device to determine communication paths in an industrial wireless network.

This object is according to a first aspect of the present invention achieved through a method for allowing a network manager device to determine communication paths in an industrial wireless network, the method being performed by a wireless communication device being a node in the industrial wireless communication network, the wireless communication device having node configuration data comprising a node weight and the method comprising the steps of:

receiving, a network investigating message from another network node, the network investigating message comprising a message weight, inspecting the network investigating message and performing further processing of the network investigating message based on the results of the inspection where the inspecting comprises determining a communication weight based on the quality of communication with the other node, forming an intermediate weight through combining the communication weight with the message weight, and
comparing the intermediate weight with the node weight,
where the further processing is performed if the message weight is lower than the intermediate weight and comprises
setting the intermediate weight as new node weight,
setting the intermediate weight as new message weight, and
sending the changed network investigating message having the new message weight to other nodes in the network.

Another object of the present invention is to provide an improved wireless communication device in an industrial wireless network.

This object is according to a second aspect of the present invention achieved through a wireless communication device for an industrial wireless network, the wireless communication device providing a node in the industrial wireless network and comprising:
a wireless transmitter,
a wireless receiver,
a node configuration memory comprising node configuration data including a node weight, and
a node configuration control unit configured to:
receive a network investigating message from another network node, the network investigating message comprising a message weight,
inspect the network investigating message and perform further processing of the network investigating message based on the results of the inspecting,
where the inspecting comprises
determining a communication weight based on the quality of communication with the other node,
forming an intermediate weight through combining the communication weight with the message weight, and
comparing the intermediate weight with the node weight,
where the further processing is performed if the intermediate weight is lower than the node weight and comprises
setting the intermediate weight as new node weight,
setting the intermediate weight as new message weight, and
sending the changed network investigating message having the new message weight to other nodes in the network.

Another object of the present invention is to provide a computer program product for a wireless communication device, which computer program product provides an improved wireless communication device.

This object is according to a third aspect achieved by a computer program product for a wireless communication device, the wireless communication device providing a node in an industrial wireless network and being provided with a node weight,
the computer program product comprising a data carrier with computer program code which when run on a processor forming a node configuration control unit of the wireless communication device, causes the node configuration control unit to:
receive a network investigating message from another network node, the network investigating message comprising a message weight,
inspect the network investigating message and perform further processing of the network investigating message based on the results of the inspecting,
where the inspecting comprises
determining a communication weight based on the quality of communication with the other node,
forming an intermediate weight through combining the communication weight with the message weight, and
comparing the intermediate weight with the node weight,
where the further processing is performed if the intermediate weight is lower than the node weight and comprises
setting the intermediate weight as new node weight,
setting the intermediate weight as new message weight, and
sending the changed network investigating message having the new message weight to other nodes in the network.

Another object of the present invention is to provide an improved method for determining communication paths in an industrial wireless network.

This object is according to a fourth aspect achieved by a method for investigating communication paths in an industrial wireless network, the method being performed by a network manager device of the industrial wireless network and comprising the steps of:
sending a network investigating message to at least one other network node for being processed and forwarded through the industrial wireless network, the network investigating message comprising a message weight,
receiving node configuration messages from the other nodes of the industrial wireless network, the node configuration messages comprising node configuration data that has been updated through processing of the network investigating message in the network nodes, the node configuration data of a node configuration message comprising a node weight of a corresponding node having been updated based on a message weight,
mapping the topology of the wireless communication network based on the node configuration data in the received node configuration messages,
setting a communication scheduling scheme based on the mapped topology, and
informing the network nodes of the communication scheduling scheme.

Yet another object of the present invention is to provide an improved network manager device.

This object is according to a fifth aspect achieved through a network manager device for an industrial wireless network, the wireless network managing device comprising:
a network topology determining unit configured to
send a network investigating message to at least one other network node for being processed and forwarded through the industrial wireless network, the network investigating message comprising a message weight,
receive node configuration messages from the other nodes of the network, the node configuration messages comprising node configuration data that has been updated through processing of the network investigating message in the network nodes, the node configuration data of a node configuration message comprising a node weight of a corresponding node having been updated based on a message weight,
map the topology of the network based on the node configuration data in the received node configuration messages, set a communication scheduling scheme based on the mapped topology, and inform the network nodes of the communication scheduling scheme.

Yet another object is to provide a computer program product for a network manager device, which computer program product provides an improved network manager device.

This object is according to a sixth aspect achieved through a computer program product for a network manager device of an industrial wireless network, the computer program product comprising a data carrier with computer program code which when run on a processor forming a network topology determining unit of the network manager device, causes the network manager device to:

send a network investigating message to at least one other network node for being processed and forwarded through the industrial wireless network, the network investigating message comprising a message weight, receive node configuration messages from the other nodes of the network, the node configuration messages comprising node configuration data that has been updated through processing of the network investigating message in the network nodes, the node configuration data of a node configuration message comprising a node weight of a corresponding node having been updated based on a message weight, map the topology of the network based on the node configuration data in the received node configuration messages, set a communication scheduling scheme based on the mapped topology, and inform the network nodes of the communication scheduling scheme.

The present invention has a number of advantages. It improves the reliability by packet delivery diversity. A routing table is not required for all nodes. Possible changes of the network topology will not terminate the communications. With the invention it will become easier to configure and download parameters to wireless field devices. This will reduce maintenance time. Furthermore, the invention will improve the transmission reliability which reduces the risk of communication failures. Because of the invention it is also possible to run safety applications on industrial wireless sensor networks. The invention is furthermore generic and therefore applicable on all types of Industrial Wireless Sensor Networks.

BRIEF DESCRIPTION OF THE DRAWINGS

The present invention will in the following be described with reference being made to the accompanying drawings, where FIG. 1 schematically shows a control system for controlling a process using an industrial wireless network, FIG. 2 schematically shows a block schematic of a network manager device controlling communication with field devices in the industrial wireless network.

DETAILED DESCRIPTION OF THE INVENTION

In the following, a detailed description of preferred embodiments of the invention will be given.

Figure 1:
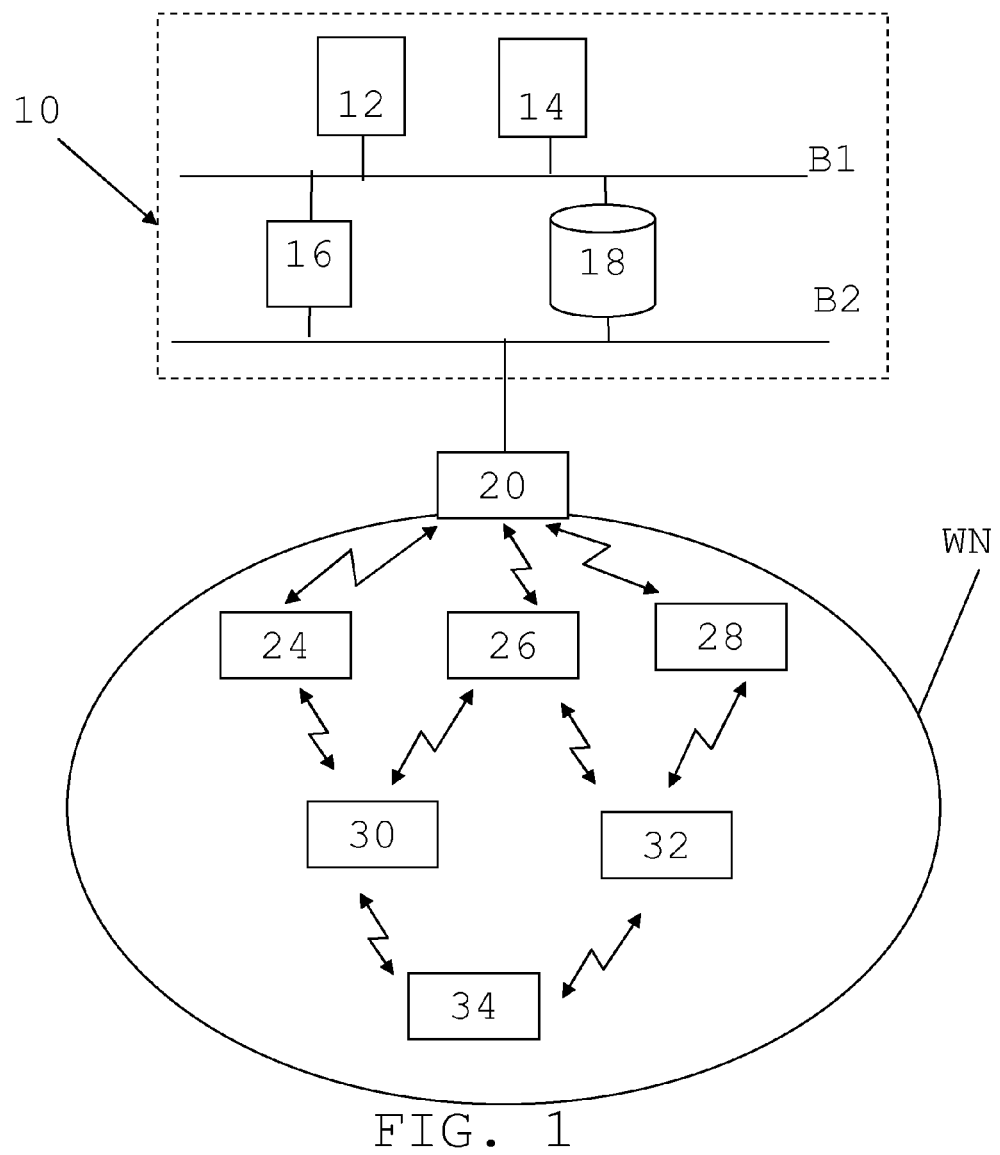

FIG. 1 schematically shows a control system 10 for a process, i.e. a process control system. The process may be an industrial process and may furthermore be any of a number of different types of processes such as a pulp and paper production process, an oil refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses there are connected a server 16 providing control and monitoring of the process and a database 18 where data, like historical data relating to control and monitoring of the process is stored. To the second bus B2 there is furthermore connected a gateway 20, which gateway is in turn connected to a wireless network WN. The wireless network WN may be an industrial network and may also be a wireless communication network. It may more particularly be a wireless sensor and actuator network (WSAN) and may thus be an industrial wireless sensor and actuator network. The industrial wireless network may also use a time division communication scheme. In this wireless network WN there are shown seven exemplifying nodes. There is a first node 24, a second node 26, a third node 28, a fourth node 30, a fifth node 32 and a sixth node 34. These nodes are provided in the form of wireless communication devices or wireless field devices. These field devices as well as the gateway are nodes in the industrial wireless network WN. The gateway 20 may therefore be considered to be a seventh node.

The field devices are devices that are interfaces to the process and they communicate wirelessly with the gateway 20. In the exemplifying network the first, second and third nodes 24, 26, 28 are furthermore shown as communicating with the gateway 20, while the fourth and fifth nodes 30 and 32 are communicating with the first, second and third nodes 24, 26 and 28. The sixth node 34 in turn communicates with the fourth and fifth nodes 30 and 32. Although the fourth, fifth and sixth nodes 30, 32 and 34 do not communicate directly with the gateway 20, they are still able to communicate with it using hop or multi-hop technique. When for instance the sixth node 34 is sending data, this data is relayed to the gateway 20 via the fifth or sixth node together with via the first, second or third node 24, 26 and 28. In a similar manner the first, second and third node 24, 26, 28 may act as relay nodes for data sent by the fourth and fifth nodes 30 and 32.

The field devices implementing the first, second, third, fourth, fifth and sixth nodes 24, 26, 28, 30, 32 and 34 may typically be responsible for performing some type of control activity of the process, such as measuring a process parameter like a physical property of the process or providing a control activity in the process, such as actuating a valve, operating a pump, a switch etc. The actual control of the field devices is performed by the server 16.

Figure 2:
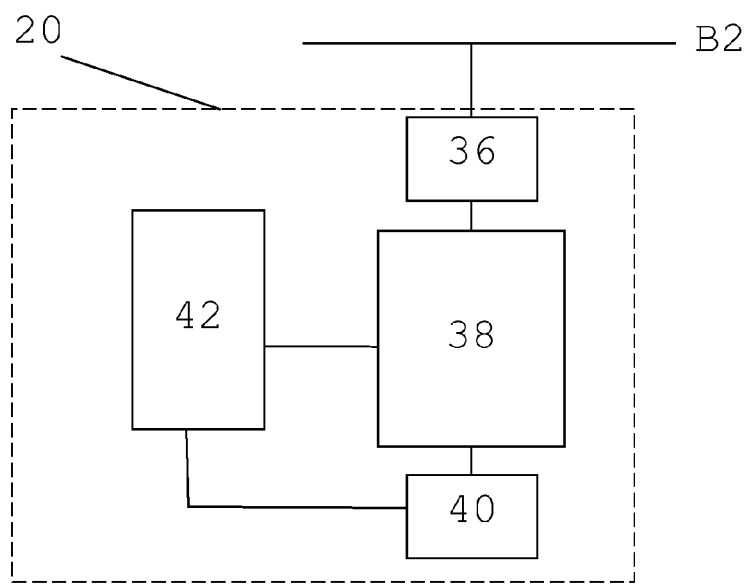

FIG. 2 shows a block schematic of the gateway 20, which is also acting as a network manager device. It will in the following only be referred to as a network manager device. The network manager device 20 comprises a data handling unit 38, which is connected to a wireless interface 40, typically comprising radio circuitry and one or more antennas, as well as to a communication interface 36 for communication using the second bus B2. The communication interface 36 may as an example be an Ethernet interface. The network manager device 20 also comprises a network topology determining unit 42 that is connected to the wireless interface 40 as well as to the data handling unit 38.

Figure 3:
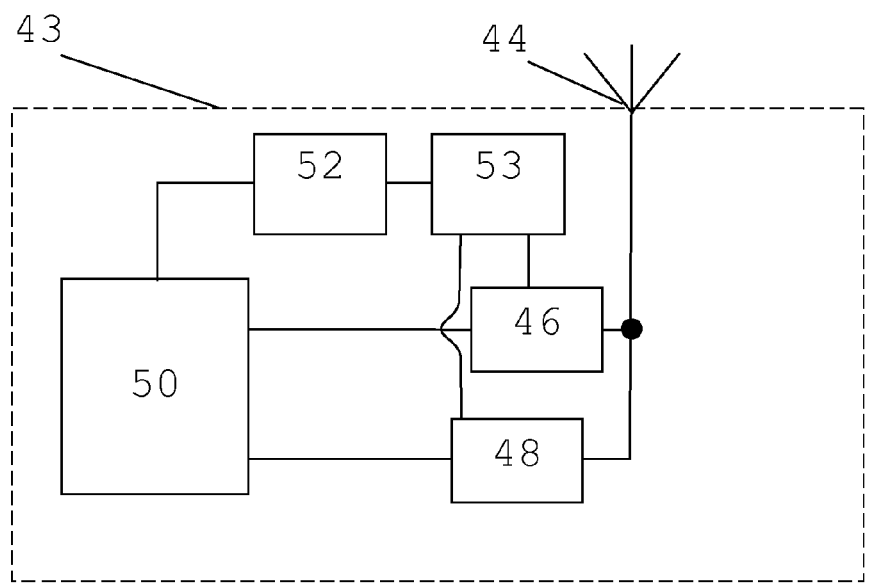
FIG. 3 shows a block schematic of a wireless communication device in the industrial wireless network.

FIG. 3 shows a block schematic of units in a wireless communication device 43 that makes up a node in the industrial wireless network. In the present example this wireless communication device 43 is the field device that implements the fourth node 30. It should be realized that all field devices may comprise the units shown in FIG. 3. The wireless communication device 43 here comprises a node configuration control unit 50, which is connected to a transmitter circuit 48 or wireless transmitter. The transmitter circuit 48 is in turn connected to an antenna 44, which is also connected to a receiver circuit 46 or wireless receiver. The receiver and transmitter circuits 46 and 48 may be combined in one circuit, a transceiver circuit. The node configuration control unit 50 is also connected to a node configuration memory 52. In the wireless communication device 43 there is also a data handling unit 53 connected to the receiver and transmitter circuits 46 and 48, to the node configuration control unit 50 and to the node configuration memory 52.

Figure 4:
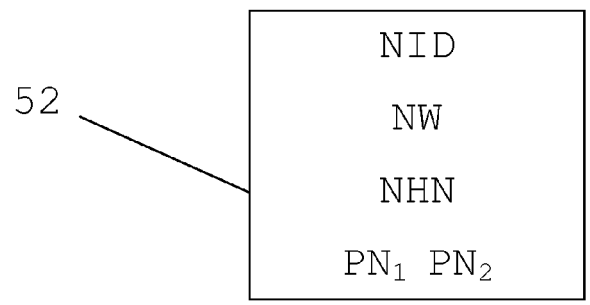
FIG. 4 shows the content of a node configuration memory of the wireless communication device, FIG. 5 schematically shows a network investigating message, FIG. 6 schematically shows a node configuration message handled by the wireless communication device, FIG. 7 schematically shows a data message sent by a node in the industrial wireless network.

FIG. 4 schematically shows the content of the node configuration memory 52. This memory comprises node configuration data. In this example the node configuration data comprises a node identifier, NID, which is an identifier identifying the wireless communication device or fourth node, which identifier is recognised by the network manager device 20. There is also a node weight NW, a node hop number NHN as well as data $PN_1$ and $PN_2$ identifying parent nodes. Data identifying a parent node may be an identifier of such a parent node. A parent node is here a node that the node 30 provided by the wireless communication device 43 employs for communicating with the network manager device 20. The parent node may thus be a relay node, and more particularly a first relay node in a number of relay nodes in a communication path from the wireless communication device 43 to the network manager device 20. The data from the wireless communication device 43 passes via this first relay node on its way from the wireless communication device to the network manager device 20.

Figure 5:

FIG. 5 schematically outlines a network investigating message NIM. The network investigating message NIM comprises a sending identifier SID, which is an identifier of the node that is sending the message. It also comprises a message weight MW as well as a message hop number MHN.

Figure 6:
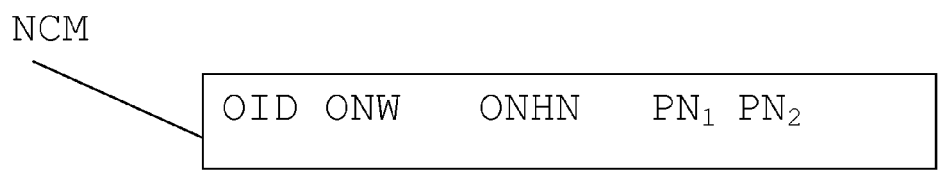

FIG. 6 schematically outlines a node configuration message NCM. The node configuration message NCM comprises node configuration data comprising an originating node identifier OID, which is an identifier of the node where the message originates, i.e. the node in which the message is originally formed or created. It also comprises an originating node weight ONW, which is the weight of this originating node, an originating node hop number ONHN, which is the hop number of this originating node. It also comprises parent node data $PN_1$ and $PN_2$ of this originating node.

Figure 7:

FIG. 7 schematically outlines a data message DM. The data message DM also comprises an originating node identifier OID, i.e. an identifier of the node where the message originates. It also comprises an originating node weight ONW and an originating node hop number ONHN. Finally it also comprises data DATA that is being sent from the originating node to the network manager device.

The data communication with which the present invention is concerned is mainly communication in the uplink, i.e. from the field devices to the manager network device. However, it should be realized that the invention may also be of interest in the downlink.

Figure 8:
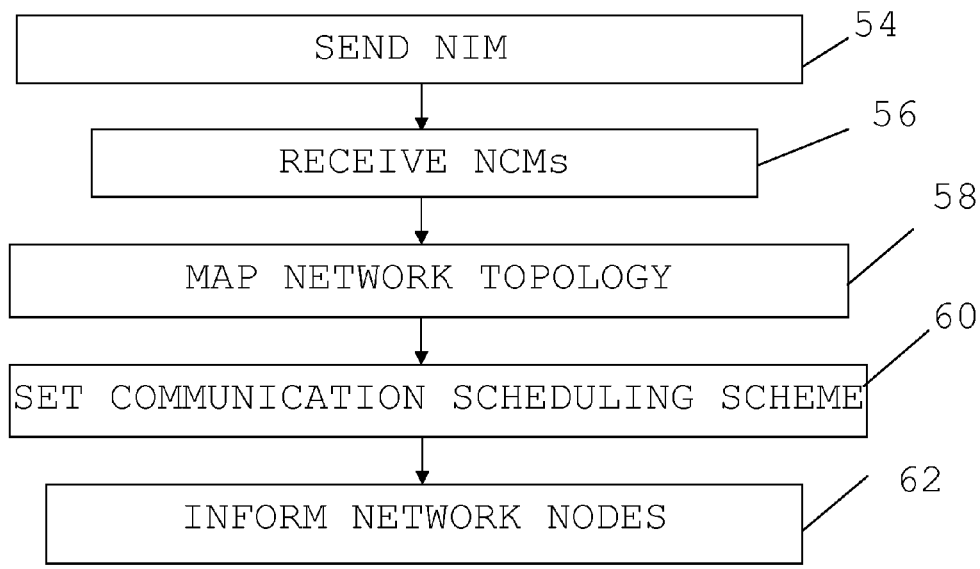
FIG. 8 shows a flow chart of a number of method steps in a method for investigating communication paths being performed by the network manager device.
Figure 9:
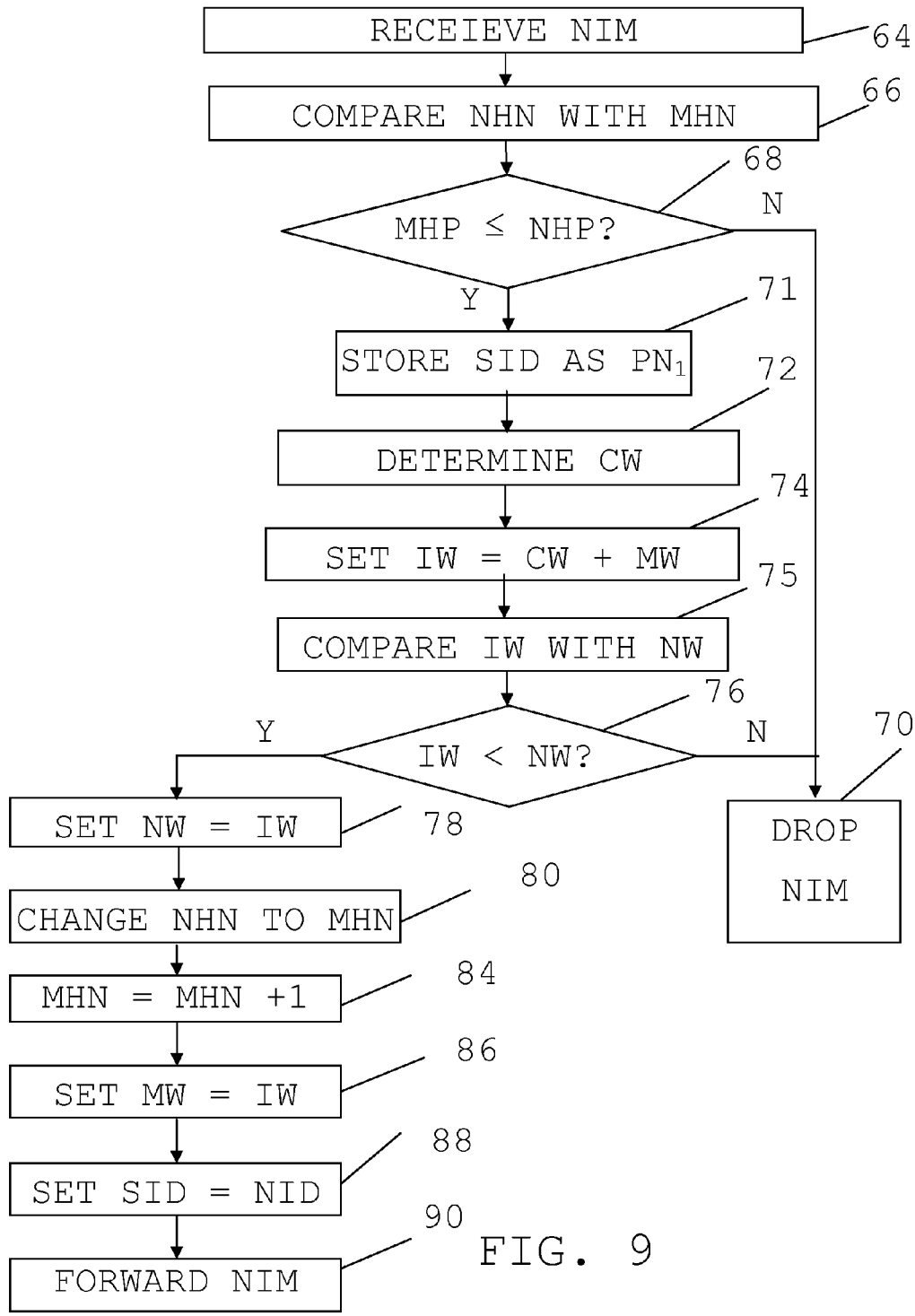
FIG. 9 shows a flow chart of number of method steps in a method for allowing the network manager device to determine communication paths, the method being performed by the wireless communication device.

The functioning of a first variation of the present invention will now be described with reference also being made to FIG. 8, which shows a flow chart of a number of method steps being performed in the network manager device and to FIG. 9, which shows a first number of method steps being performed in the wireless communication device.

When a new node attempts to join the wireless communication network, the network topology determining unit 42 of the network manager device 20 assigns an initial node weight to it as well as an initial hop number. The node weight is a measure of the quality of communication links between the node and the network manager device, while the hop number is a counter indicating how many hops away from the network manager device 20 the node is. These assignments are being sent via the wireless interface 40. The initial weight is typically a weight having a high number, such as 99 and the hop number is typically also initially a high number such as 99. As an example the wireless communication device 43 that implements the fourth node 30 is considered to be such a node being initiated. These initial settings are then received by the receiver 46 and forwarded to the node configuration control unit 50, which stores them in the node configuration memory 52. In this memory 52 there may already be stored a node identifier NID. Initially there are no parent node identifiers.

In order to find out the real configuration of the network, i.e. which nodes communicate with which and how well they communicate with each other, the network topology determining unit 42 sends a network investigating message NIM, step 54. The message is sent via the wireless interface 40 and comprises a sending identifier SID, which is thus initially the identifier of the network manager device 20, a message weight MW and a message hop number MHN. The message weight MW is initially set to the lowest node weight in the network, which may be zero, and the message hop number MHN is also initially set to the lowest hop number in the network, which may likewise be zero. However, both these values as well as the sending identifier SID are being changed in the course of the network investigating message NIM passing through the network WN. The network investigating message NIM is sent to at least one other network node for being processed and forwarded through the industrial wireless network. The network investigating message NIM may more particularly be broadcast in the network so that all nodes that are able to communicate directly with the network manager device 20 receive it. The message NIM may more particularly be sent regularly, such as once a minute, once every ten minutes once an hour etc. As an alternative it is possible that the message NIM is sent as soon as the network manager device loses contact with another node.

As is mentioned above, as the message traverses the network it gets changed. A node that forwards it in the network more particularly sets its own network identifier to be the sending identifier SID. It may also change the message weight and message hop number. How this is done will be described below.

When about to receive a network investigation message for the first time the field devices are thus all using their initial node hop numbers NHN and initial node weights NW.

In the example given above the network investigation message NIM is for instance first received by the first node 24, which changes it and then passes the message on to the wireless communication device 43 that implements the fourth node 30. This means that the first node 24 has changed the content of the network investigating message NIM from the original content provided by the network manager device 20. More particularly the network investigating message NIM has received a new sending identifier SID, being the identifier of the first node 24, a new message weight MW and a new message hop number MHN, which is typically the hop number of one.

The network investigating message NIM is then received in the wireless communication device 43 by the receiver 46 via the antenna 44 and forwarded to the node configuration control unit 50. The network investigating message NIM is thus received by the node configuration control unit 50, step 64.

The node configuration control unit 50 then fetches the node hop number NHN from the node configuration memory 52 and thereafter compares the node hop number NHN with the message hop number MHN, step 66. In case the message hop number MHN is lower than or equal to the node hop number NHN, step 68, then the node configuration control unit 50 stores the sending identifier SID as an identifier $PN_1$ of a parent node, step 71, and thereafter inspects the network investigating message NIM further. However, if the message hop number MHN is higher than the node hop number NHN, step 68, then the network investigating message NIM is dropped by the node configuration control unit, step 70.

The further inspection of the network investigating message NIM comprises the determining of a communication weight CW, step 72. The determination of the communication weight CW may involve the determining of communication quality between the sending node, i.e. the node from which the wireless communication device 43 receives the network investigating message NIM, which in this example is the first node 24. The communication weight CW is thus determined based on the quality of communication with the other node from which the message NI is received and may for instance be determined based on received signal strength indicator (RSSI), bit error rate, packet error rate and link quality indicators LQI.

Thereafter the node configuration control unit 50 forms an intermediate weight IW, step 74, which intermediate weight IW is formed through combining the communication weight with the message weight. In this example the intermediate weight IW is thus formed through adding the communication weight CW to the message weight WM. The intermediate weight IW is in this example thus formed as the sum of the communication weight CW and the message weight MW. When this has been done the node configuration control unit 50 fetches the node weight NW from the node configuration memory 52 and thereafter compares the intermediate weight with the node weight WN, step 75.

If then the intermediate weight IW is lower than the node weight NW, step 76, further processing is performed, while if it is higher than or equal to the node weight NW, step 76, then the network investigating message NIM is dropped by the node configuration control unit 50, step 70.

The further processing does in this case involve an updating of the settings in the node configuration memory 52. It more particularly involves the node configuration control unit 50 setting the intermediate weight IW as a new node weight NW, step 78, changing the node hop number NHN to the message hop number MHN, step 80. It is here also possible to provide a link between the new node weight and the identifier of the corresponding parent node.

The further processing also involves changing the content of the network investigating message NIM. The node configuration control unit 50 changes the message hop number MHN through increasing it. The message hop number is thus increased, and in this example incremented, step 84. The intermediate weight IW is also set as new message weight MW, step 86, and the sending identifier SID is set to be equal to the network identifier NID of the node, step 88. The sending identifier SID is thus set to be the same as the node identifier NID stored in the node configuration memory 52. Thereafter the node configuration control unit 50 forwards the network investigating message through the network, step 90. In this way a changed network investigating message having the new message weight is sent to the other nodes in the network. The network investigating message NIM being sent is thus an updated network investigating message where there is a new message weight, a new message hop number and a new sender identifier SID. The sending may be performed through making the transmitter 48 broadcast the network investigating message through the network.

All the nodes function in the above-described way. This means that the first, second and third nodes 24, 26 and 28 forward network investigation messages through the communication network WN.

In this case it is also possible that the wireless communication device 43 also receives and processes a network investigating message from the second node 26 and thus stores the identifier of this node as a parent node $PN_2$.

Furthermore, since all nodes operate in the above described manner, the first second and third nodes 24, 26 and 28 will all drop the network investigation messages they receive from the fourth node 30, since they will both have lower hop numbers and weights than the message hop number and message weight of this particular network investigating message. The fifth node 32 may most likely drop the message but the sixth node 34 will likely receive and process it.

When the broadcasting of the network manager device 20 is finished and the network investigating message has reached all nodes, they all need to respond with updated node weights, updated hop numbers and updated parent node identifiers.

Therefore, when the network investigating message NIM in this way has passed through the network WN and been processed, all the nodes thereafter respond with a node configuration message NCM. Thus for instance the node configuration control unit 50 of the wireless communication device 53 sends a node configuration message NCM with node configuration data destined for the network manager device 20, which message is also sent via the transmitter unit 48 and antenna 44. The node configuration data may furthermore be node configuration data that has been updated through processing of the network configuration message and may more particularly comprise an updated node weight. The node configuration message may also have been sent as a response to the original network investigating message sent by the network manager device.

The node configuration message NCM then comprises the originating node identifier OID, which in the case of the wireless communication device 43 is the network identifier NID stored in the node configuration memory 52 of the fourth node 30. The node configuration message NCM also comprises the originating node weight ONW, the originating node hop number ONHN as well as the identifiers of parent nodes $PN_1$ and $PN_2$ obtained in the above described process. In short the node configuration message NCM comprises the current settings of node weight, node hop number and parent nodes that are present in the node configuration memory 52. It may also comprise a link between the node weight and the corresponding parent node.

The node configuration messages NCM from all the other network nodes 24, 26, 28, 30, 32, and 34 are then received by the network topology determining unit 42 of the network manager device 20 via the wireless communication interface 40, step 56. These messages may thus comprise node configuration data that has been updated through processing, in the other nodes, of the network investigating message and at least one may comprise a node weight of a corresponding node that has been updated based on a message weight. The network topology determining unit 42 then maps the network topology based on the node configuration data of the received node configuration messages, step 58. This may involve determining various communication paths used by the nodes to communicate with the network manager device as well as which of those paths that are preferred. A preferred path may for instance be obtained through knowing the link between a node weight and a parent node. The mapping may more particularly involve the determining of a communication tree, i.e. a tree depicting how the nodes are connected to a root node, the network manager device 20.

After this has been done the network topology determining unit 42 sets a communication scheduling scheme, step 60, which involves determining where in the communication structure the nodes are to communicate, such as which time slots in the TDMA structure they are to use. After this has been done the network topology determining unit 42 informs the network nodes of the communication scheduling scheme using the wireless interface 40, step 62, which may involve informing them of which time slots they are to use for communications. It may also involve confirming the node hop numbers and node weights. It should here be realized that a confirmation may just as well be sent before informing of the scheduling scheme.

The network manager device 20 will thus use the information in the node configuration messages to generate a topology tree of the network, reschedule the network and thereafter send a command to all nodes with a new scheduling scheme which allows all nodes to use their updated weight and hop numbers.

Figure 10:
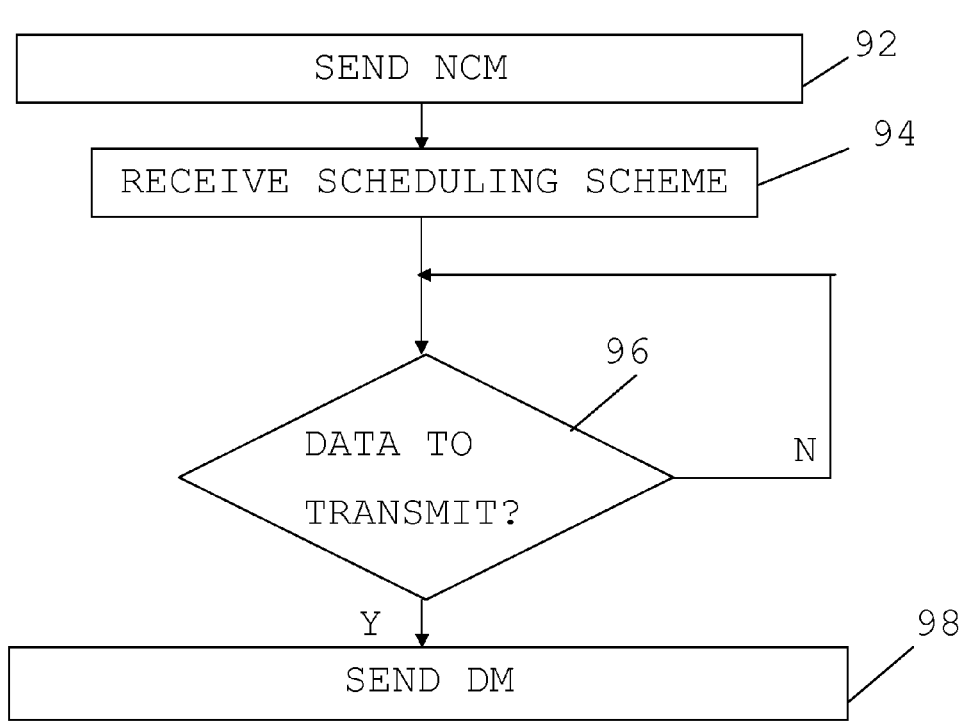
FIG. 10 shows a flow chart of a number of method steps for informing the network manager device about the communication paths and sending a data message.
Figure 11:
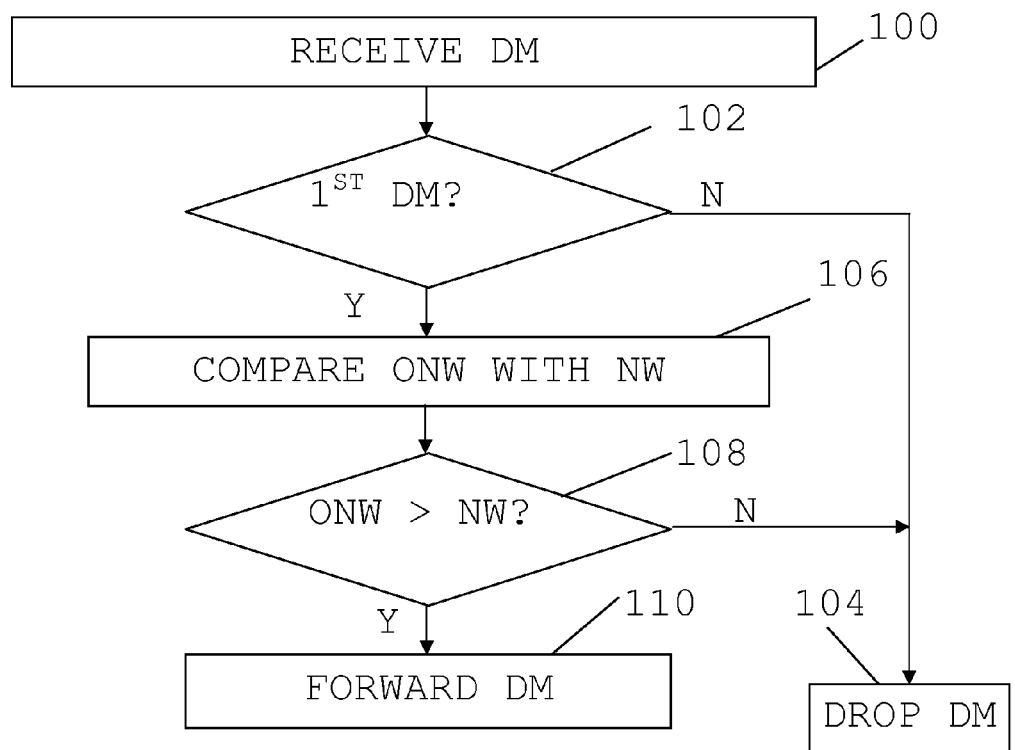
FIG. 11 shows a flow chart of a number of method steps showing how a node in the industrial wireless network handles a received data message, and FIG. 12 schematically shows a data carrier carrying program code for implementing a node configuration control unit of a wireless communication device or a network topology determining unit of a network manager device.

After the scheduling has been taking place it is then possible for the nodes to transmit data to the network manager device 20 in the assigned time slots. How this can be done forms a second variation of the invention, which will now be described with reference being made to FIG. 10, which shows a flow chart of a number of method steps for informing a network managing device about the communication paths, and to FIG. 11, which shows a flow chart of a number of method steps showing how a node in the industrial wireless network handles a received data message.

After having sent the node configuration message, step 92, and having received the scheduling scheme, step 94, a node, such as the sixth node 34 continuously investigates if there is data to transmit. This may be done through the data handling unit 53 of the wireless communication device investigating if there is sensor data to be transmitted. In case there is data to transmit, step 96, then a data message DM intended for the network manager device 20 is sent, step 98. The data message is then sent including an originating node identifier OID, an originating node weight ONW, which may be an updated node weight, an originating node hop number ONHN and data DATA to be reported to the network manager device 20. This data message DM is typically sent using broadcasting. In the example given here, the originating node identifier OID, originating node weight ONW, originating node hop number ONHN and data are all associated with the sixth node 34.

The data handling unit 53 of a node in the network such as the fourth node 30 then receives such a data message DM via the antenna 44 and receiver 46, step 100. It then investigates if it is the first time it receives this particular data message. If it is not, step 104, then the data message DM is dropped. However if it is the first time the data message is received, step 102, then the message is processed.

This processing involves comparing the originating node weight ONW with the node weight NW, step 106. This means that the data handling unit 53 compares the node weight NW of the own node being stored in the node configuration memory 52 with the originating node weight ONW in the received data message DM, which is the weight of the node that sends the data destined for the network manager device 20. This node is thus a message originating node, i.e. a node in which the data message DM originates. If the originating node weight ONW is higher then the own node weight NW, step 108, then the data message DM is forwarded, step 110, which forwarding may also here be performed through broadcasting. However, if the originating node weight ONW is lower then the own node weight NW, step 108, then data message DM is dropped, step 104.

It should here be noted that all nodes, including the network manager device, operate in the same way. However, the network manager has a weight of zero, which ensures that it will receive data messages from all nodes.

It can be seen that since the data message will be forwarded from larger weight node to smaller weight node, this message will finally arrive at the network manger device, which has the smallest weight, for instance zero.

As mentioned earlier the network manager device 20 may send the network investigating message regularly. Some time after having sent the previously mentioned network investigating message, the network manager device may thus send a new message. When this happens the field devices will all reset their node hop numbers and node weights to their initial node hop numbers and node weights, i.e. to the values initially assigned by the network manager device. This can be done through receiving a special re-set instruction from the network manager device. It can also be done through detecting the first presence of a network investigating message after a previous confirmation from the network manager device.

The invention has a number of advantages. It improves the reliability by packet delivery diversity. A routing table is not required for all nodes. Possible changes of the network topology will not terminate the communications. With the invention it will become easier to configure and download parameters to wireless field devices. This will reduce maintenance time. Furthermore, the invention will improve the transmission reliability which reduces the risk of communication failures. Because of the invention it is also possible to run safety applications on industrial wireless sensor networks. The invention is furthermore generic and therefore applicable on all Industrial Wireless Sensor Networks.

There are a number of variations that can be made of the present invention. The network manager device is not necessarily a gateway. It is possible to provide as a separate device in the network. If it is a separate device, the network topology determining unit will be a part of the network manager device. However, the data handling unit will be placed in the gateway. As the node hop number is used in the data message, this can also be used for determining if a data message is to be forwarded or not. It should however be realized that the originating node hope number may be omitted from the data message. It should in fact be realized that the use of hop numbers may be omitted completely. It is possible to only use weights for determining if a network investigating message is to be forwarded through the network. It is in fact also possible that only node weights are reported. This also means that the determination and use of parent node identifiers may also be omitted. In the case where hop numbers are used it is furthermore possible that the parent node identifiers are set as a part of the further processing.

Figure 12:
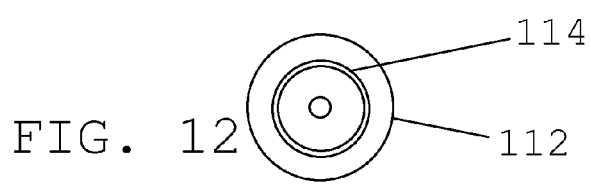

The node configuration control unit and optionally also the data handling unit of the wireless communication device may be realized in the form of a discrete component, such as an Application Specific Integrated Circuit (ASIC) or Field-Programmable Gate Array (FPGA) circuit, which may also comprise the other units and circuits of the first field device. However, the node configuration control unit may also be realized through a processor with an associated program memory including computer program code for performing the functionality of the node configuration control unit when being run on the processor. This computer program product can be provided as a data carrier such as one or more CD ROM discs or one or more memory sticks carrying computer program code, which provides the above-described access control unit when being run by said processor. One such data carrier 112 in the form of a CD ROM disk with a computer program 114 carrying such computer program code is schematically shown in FIG. 12. Also the network topology determining unit and optionally also the data handling unit of the network manager device may be realized in the above-described ways.

From the foregoing discussion it is evident that the present invention can be varied in a multitude of ways. It shall consequently be realized that the present invention is only to be limited by the following claims.

The invention claimed is:

1. A method for allowing a network manager device to determine communication paths in an industrial wireless network, the method being performed by a wireless communication device being a node in the industrial wireless communication network, the wireless communication device having node configuration data comprising a node weight and the method comprising the steps of:
  receiving, a network investigating message from another network node, the network investigating message comprising a message weight; and
  inspecting the network investigating message and performing further processing of the network investigating message based on the results of the inspection,
  where the inspecting comprises:
    determining a communication weight based on the quality of communication with the other node;
    forming an intermediate weight through combining the communication weight with the message weight; and
    comparing the intermediate weight with the node weight,
  where the further processing is performed if the message weight is lower than the intermediate weight and comprises:
    setting the intermediate weight as new node weight, weight;
    setting the intermediate weight as new message weight, weight; and
    sending the changed network investigating message having the new message weight to other nodes in the network.

2. The method according to claim 1, further comprising the step of sending a node configuration message with node configuration data to the network manager device, the node configuration data comprising node configuration data that has been updated through the processing of the network investigating message including an updated node weight.

3. The method according to claim 2, wherein the node configuration message comprises data sent as a response to an original network investigating message sent by the network manager device.

4. The method according to claim 1, further comprising the step of sending a data message intended for the network manager device, the data message comprising the updated node weight and data to be reported to the network manager device.

5. The method according to claim 1, further comprising the steps of:
  receiving a data message from another network node, said data message comprising a node weight of a message originating node;
  comparing the received node weight with the own node weight; and
  forwarding the data message to other nodes in case the received node weight is higher than the own node weight.

6. The method according to claim 1, wherein the node configuration data comprises a node hop number and the network investigating message comprises a message hop number, the method further comprising the step of comparing the node hop number with the message hop number, where the inspecting and further processing is only performed if the message hop number is lower than or equal to the node hop number and in this case the further processing also comprises changing the node hop number to the message hop number and increasing the message hop number.

7. The method according to claim 1, wherein the network investigating message comprises an identifier of the other node and the processing based on the investigation further comprises the step of storing the identifier of the other node as a parent node in the node configuration data.

8. A wireless communication device for an industrial wireless network, the wireless communication device providing a node in the industrial wireless network and comprising:
  a wireless transmitter;
  a wireless receiver;
  a node configuration memory comprising node configuration data including a node weight; and
  a node configuration control unit configured to:
    receive a network investigating message from another network node, the network investigating message comprising a message weight; and
    inspect the network investigating message and perform further processing of the network investigating message based on the results of the inspecting, where the inspecting comprises:
    determining a communication weight based on the quality of communication with the other node;
    forming an intermediate weight through combining the communication weight with the message weight; and comparing the intermediate weight with the node weight, where the further processing is performed if the intermediate weight is lower than the node weight and comprises setting the intermediate weight as new node weight;

setting the intermediate weight as new message weight; and sending a changed network investigating message having the new message weight to other nodes in the network.

9. The wireless communication device according to claim 8, further compromising a data message handling unit configured to receive a data message from another network node, said data message comprising a node weight of a message originating node, compare the received node weight with the own node weight and forward the data message to other nodes in case the received node weight is higher than the own node weight.

10. A computer program product for a wireless communication device, the wireless communication device providing a node in an industrial wireless network and being provided with a node weight, the computer program product comprising a non-transitory data carrier with computer program code which when run on a processor forming a node configuration control unit of the wireless communication device, causes the node configuration control unit to:

receive a network investigating message from another network node, the network investigating message comprising a message weight; and inspect the network investigating message and perform further processing of the network investigating message based on the results of the inspecting, where the inspecting comprises determining a communication weight based on the quality of communication with the other node;

forming an intermediate weight through combining the communication weight with the message weight; and comparing the intermediate weight with the node weight, where the further processing is performed if the intermediate weight is lower than the node weight and comprises setting the intermediate weight as new node weight;

setting the intermediate weight as new message weight; and sending a changed network investigating message having the new message weight to other nodes in the network.

11. A method for investigating communication paths in an industrial wireless network, the method being performed by a network manager device of the industrial wireless network and comprising the steps of:

sending a network investigating message to at least one other network node for being processed and forwarded through the industrial wireless network, the network investigating message comprising a message weight;

receiving node configuration messages from the other nodes of the industrial wireless network, the node configuration messages comprising node configuration data that has been updated through processing of the network investigating message in the network nodes, the node configuration data of a node configuration message comprising a node weight of a corresponding node having been updated based on a message weight;

mapping the topology of the wireless communication network based on the node configuration data in the received node configuration messages;

setting a communication scheduling scheme based on the mapped topology; and informing the network nodes of the communication scheduling scheme.

12. The method according to claim 1, wherein the node configuration data comprises a node hop counter values and the node investigating message comprises a message hop counter value.

13. The method according to claim 11, wherein the node configuration data comprises parent node data for the network nodes.

14. The method according to claim 11, wherein the network investigating message is periodically sent in the industrial wireless network.

15. The method according to claim 11, wherein the network manager device comprises an own node weight and further comprising the steps of:

receiving a data message from a network node, said data message comprising a node weight of a message originating node;

comparing the received node weight with the own node weight; and processing the data message in case the received node weight is higher than the own node weight.

16. A network manager device for an industrial wireless network, the wireless network managing device comprising:

a network topology determining unit configured to:

send a network investigating message to at least one other network node for being processed and forwarded through the industrial wireless network, the network investigating message comprising a message weight;

receive node configuration messages from the other nodes of the network, the node configuration messages comprising node configuration data that has been updated through processing of the network investigating message in the network nodes, the node configuration data of a node configuration message comprising a node weight of a corresponding node having been updated based on a message weight;

map the topology of the network based on the node configuration data in the received node configuration messages;

set a communication scheduling scheme based on the mapped topology; and inform the network nodes of the communication scheduling scheme.

17. The network manager device according to claim 16, further comprising an own node weight and a data handling unit configured to receive a data message from a network node, said data message comprising a node weight of a message originating node, compare the received node weight with the own node weight and process the data message in case the received node weight is higher than the own node weight.

18. A computer program product for a network manager device of an industrial wireless network, the computer program product comprising a non-transitory data carrier with computer program code which when run on a processor forming a network topology determining unit of the network manager device, causes the network manager device to:

send a network investigating message to at least one other network node for being processed and forwarded through the industrial wireless network, the network investigating message comprising a message weight;

receive node configuration messages from the other nodes of the network, the node configuration messages comprising node configuration data that has been updated through processing of the network investigating message in the network nodes, the node configuration data of a node configuration message comprising a node weight of a corresponding node having been updated based on a message weight;

map the topology of the network based on the node configuration data in the received node configuration messages;

set a communication scheduling scheme based on the mapped topology; and inform the network nodes of the communication scheduling scheme.

19. The method according to claim 2, further comprising the step of sending a data message intended for the network manager device, the data message comprising the updated node weight and data to be reported to the network manager device.

20. The method according to claim 3, further comprising the step of sending a data message intended for the network manager device, the data message comprising the updated node weight and data to be reported to the network manager device.

* * * * *